…

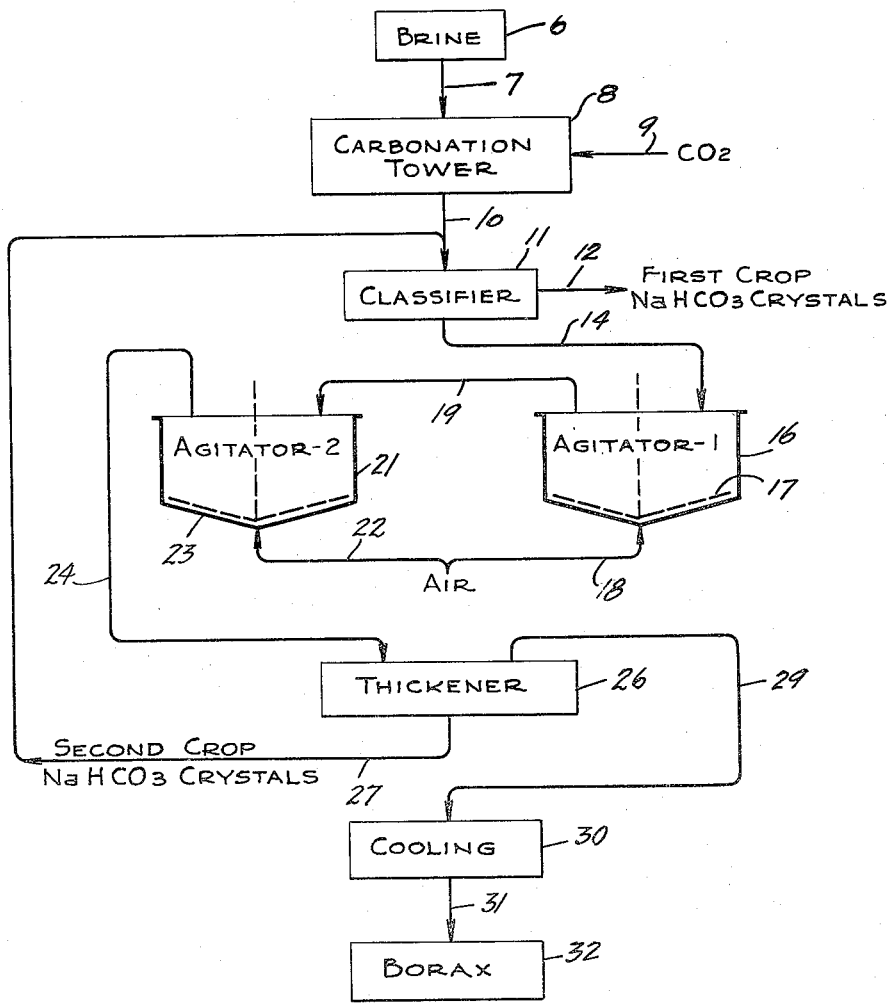

UNITED STATES PATENT OFFICE 2,540,648

PROCESS FOR RECOVERING SODIUM BICARBONATE AND SODIUM BORATE FROM A COMPLEX BRINE

Lynn A. Blackmun, Westend, Calif., assignor to West End Chemical Company, a corporation of California Application September 25, 1946, Serial No. 699,283

11 Claims. (Cl. 23—59)

This invention relates to a process for the treatment of a complex brine such as that which occurs naturally at Searles Lake, California, and which may contain various salts such as sodium carbonate, sodium chloride, sodium sulphate, potassium chloride and various sodium salts of boric acid. More particularly, this invention is concerned with a process for the recovery of sodium bicarbonate and borax from the brine. In Patent 1,756,122 of April 29, 1930, Hellmers disclosed a process wherein a complex brine such as that derived from Searles Lake was carbonated to precipitate sodium bicarbonate. The solution remaining after removal of the sodium bicarbonate is saturated with respect to borax which crystallizes out when the solution is cooled. As is indicated in the aforementioned patent, what occurs in the brine during carbonation may be represented by the following:

(1)   $Na_2CO_3 + CO_2 + H_2O \rightarrow 2NaHCO_3$
(2)   $Na_2B_2O_4 + 2CO_2 + H_2O \rightarrow Na_2B_4O_7 + NaHCO_3$ The carbonation is carried on under pressure until carbon dioxide is present in the brine in excess of that required to effect the precipitation of a substantial portion of the sodium carbonate present as sodium bicarbonate. In the aforementioned patent, it is indicated that this excess of carbon dioxide probably served another useful purpose; e. g., carbonic acid is a stronger acid than boric acid and therefore an equilibrium is probably established in the brine undergoing carbonation, in accordance with the following:

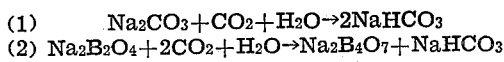

As the process of Patent 1,756,122 has been practiced commercially, the brine from Searles Lake is fed into a carbonation tower wherein it is carbonated with carbon dioxide under a pressure of 35 to 40 pounds gauge. The sludge from the carbonation towers is discharged into a classifier where the sodium bicarbonate crystals rapidly settle to the bottom and are removed by the classifier rakes. The remaining brine is then cooled so that sodium borate decahydrate,

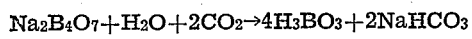

crystallizes out. In commercial operation when this process was first undertaken at Searles Lake, substantially all of the bicarbonate of soda contaminating the borax crystallized from the brine could be removed by a simple washing operation on a vacuum filter. I have now observed that the borax which precipitates is relatively impure and that sufficient sodium bicarbonate is present to make further purification of the borax a necessity. I cannot say at present to what factor this is attributable; Searles Lake has been undergoing exploitation and utilization for many years. The practice heretofore has been to pump the brine from only certain levels in the lake, usually at a depth of between 50 and 90 feet. With the brine continuously extracted from this region in the lake, the surface water running into the lake and the dilute brine present in the upper portion of the lake may be diluting the lower brine body and altering its composition. In any case, and irrespective of the explanation, whereas the borax produced heretofore has been substantially sodium bicarbonate free, sufficient sodium bicarbonate now precipitates with the borax during the cooling of the brine as to make borax refining essential. In any case, and irrespective of the explanation for the sodium bicarbonate contamination of the borax, I have now discovered that by agitating the brine before cooling and after a first crop of sodium bicarbonate crystals have been deposited, a second crop of sodium bicarbonate crystals can be recovered so that thereafter the remaining brine can be cooled and the borax precipitated in a relatively pure state.

This improvement I have been able to practice successfully on a commercial scale to produce the borax and sodium bicarbonate in relatively pure state, the borax being of such composition that recrystallization of the borax was made unnecessary.

It is in general the broad object of the present invention to provide a novel and improved process for the treatment of a complex brine such as that found in Searles Lake, California, to the end that sodium bicarbonate and borax can each be recovered in a relatively pure state.

The invention includes other objects and features of advantage, some of which, together with the foregoing, will appear hereinafter wherein the present preferred form of process of treating a complex brine is disclosed.

The drawing accompanying and forming a part hereof is a diagrammatic apparatus representation and a flow sheet.

Referring to the drawing, the brine, as derived from Searles Lake or from any other suitable source 6 of a complex brine, is fed through line 7 into a suitable carbonation tower or towers 8, preferably at the upper end thereof. Carbon dioxide is introduced from a suitable source 9 under a pressure of 40 to 45 pounds at the base of the tower to carbonate the brine and form sodium bicarbonate from the sodium carbonate present. The exit slurry from the carbonation tower is then run through line 10 into a classifier 11 wherein, under atmospheric pressure, the sodium bicarbonate crystals settle to the bottom and are taken off through line 12 as a first crop of sodium bicarbonate crystals.

The brine from the classifier is taken off through a line 14 to a first agitator 16 wherein the brine is agitated as by means of paddles 17 and by introducing air from line 18 so that the entire mass of brine in the agitator is subject to agitation to the end that crystal formation of sodium bicarbonate occurs. The overflow brine passes through line 19 into a second agitator 21 into which air is also introduced through a line 22 and wherein the brine is further agitated as by paddles 23 until crystallization of the sodium bicarbonate is substantially complete. The slurry from agitator 21 is taken off through a line 24 into a thickener 26, the underflow from which, containing the second crop of sodium bicarbonate crystals, is drawn off through line 27, and returned through line 10 for feed to classifier 11. The remaining brine, constituting the overflow from thickener 26, is taken off through line 29 and is cooled or is otherwise suitably treated as at 30 to effect the precipitation of borax which is then removed through line 31 and recovered as at 32.

In previous operations, the brine removed from the classifier 11 has been fed directly into cooler 30 and the brine has not been subject to the agitation and retention provided by agitators 16 and 21. While this operation was continued successfully on a commercial basis for many years, it has now been found that the resulting borax, instead of being relatively pure, as has been the case in the past practice of the process, is contaminated with sodium bicarbonate. By agitating the brine suitably for an adequate period of time, a second crop of sodium bicarbonate crystals can be derived, prior to the borax recovery operation, so that subsequently the borax can be recovered in the same state of relative purity as was the case when operation of the Hellmers process was first undertaken. The extent and seriousness of the borax contamination will be more apparent when I point out that the second crop of crystals amounts to as much as 20% of the total bicarbonate recovery. The first crop of bicarbonate crystals usually comprises 80% to 85% of the total bicarbonate recovery, from 15% to 20% being recovered as the second crop.

The extent of agitation and the amount of air addition depends, in each case, upon the vigorousness of the agitation, the temperature of the brine, the extent to which the sodium bicarbonate has been previously precipitated and other factors. I have found that by agitating the brine slowly for a period of 8 to 9 hours total retention in the two agitators, sufficient of the sodium bicarbonate is removed as a second crop of crystals to ensure that the borax finally recovered is of the desired and requisite purity.

From the foregoing, it is believed to be apparent that I have disclosed a novel and worthwhile improvement in the art of treating complex brine to recover sodium bicarbonate and borax. It is not necessary that the first crop of sodium bicarbonate crystals be actually separated from the brine prior to the agitation to bring down the second crop. I prefer to separate the first crop because it simplifies the operation and the apparatus required.

I claim:

1. A process for recovering sodium bicarbonate from a brine containing sodium carbonate and sodium borate comprising carbonating the brine until (a) carbon dioxide is present in solution in excess of that required to convert substantially all the sodium carbonate present to sodium bicarbonate and (b) a first crop of sodium bicarbonate crystals precipitates in the brine, separating the precipitated sodium bicarbonate from the brine, then agitating and aerating the brine to form and to precipitate a second crop of sodium bicarbonate crystals in the brine, separating the second crop of sodium bicarbonate crystals from the brine, and then recovering the sodium borate from the brine as substantially pure sodium borate decahydrate.

2. A process for recovering sodium bicarbonate from a brine containing sodium carbonate and sodium borate comprising carbonating the brine until (a) carbon dioxide is present in solution in excess of that required to convert substantially all the sodium carbonate present to sodium bicarbonate and (b) a first crop of sodium bicarbonate crystals precipitates in the brine, separating the precipitated sodium bicarbonate from the brine, then aerating and agitating the brine to form and to precipitate a second crop of sodium bicarbonate crystals in the brine, separating the second crop of sodium bicarbonate crystals from the brine, and then cooling the brine to precipitate substantially pure borax therefrom.

3. A process for recovering sodium bicarbonate from a brine containing sodium carbonate and sodium borate comprising carbonating the brine until (a) carbon dioxide is present in solution in excess of that required to convert substantially all the sodium carbonate present to sodium bicarbonate and (b) a first crop of sodium bicarbonate crystals precipitates in the brine, separating the precipitated sodium bicarbonate from the brine, then slowly agitating the brine for a period of about eight hours to form and to precipitate a second crop of sodium bicarbonate crystals in the brine, separating the second crop of sodium bicarbonate crystals from the brine, and then recovering the sodium borate from the brine as substantially pure sodium borate decahydrate.

4. A process for recovering sodium bicarbonate from a brine containing sodium carbonate and sodium borate comprising carbonating the brine until (a) carbon dioxide is present in solution in excess of that required to convert substantially all the sodium carbonate present to sodium bicarbonate and (b) a first crop of sodium bicarbonate crystals precipitates in the brine, separating the precipitated sodium bicarbonate from the brine, then slowly agitating the brine for a period of about eight hours to form and to precipitate a second crop of sodium bicarbonate crystals in the brine, separating the second crop of sodium bicarbonate crystals from the brine, and then cooling the brine to precipitate substantially bicarbonate free borax therefrom.

5. A process for recovering sodium bicarbonate from a brine containing sodium carbonate and sodium borate comprising carbonating the brine until (a) carbon dioxide is present in solution in excess of that required to convert substantially all of the sodium carbonate present to sodium bicarbonate and (b) a first crop of sodium bicarbonate crystals precipitates in the brine, separating the precipitated sodium bicarbonate from the brine, then slowly agitating the brine for a period of about eight hours while aerating the brine to form and to precipitate a second crop of sodium bicarbonate crystals in the brine, separating the second crop of sodium bicarbonate crystals from the brine, and then cooling the brine to precipitate substantially bicarbonate free borax therefrom.

6. A process for recovering sodium bicarbonate from a brine containing sodium carbonate and sodium borate comprising carbonating the brine under a super-atmospheric pressure until (a) carbon dioxide is present in solution in excess of that required to convert substantially all the sodium carbonate present to sodium bicarbonate and (b) a first crop of sodium bicarbonate crystals precipitates in the brine amounting to 80 to 85 per centum of the total carbonates present, separating the precipitated sodium bicarbonate from the brine, then agitating the brine under atmospheric pressure without the addition of additional carbon dioxide to form and to precipitate a second crop of sodium bicarbonate crystals in the brine, separating the second crop of sodium bicarbonate crystals from the brine, and then recovering the sodium borate from the brine as substantially pure sodium borate decahydrate.

7. A process for recovering sodium bicarbonate from a brine containing sodium carbonate and sodium borate comprising carbonating the brine under a super-atmospheric pressure until (a) carbon dioxide is present in solution in excess of that required to convert substantially all the sodium carbonate present to sodium bicarbonate and (b) a first crop of sodium bicarbonate crystals precipitates in the brine amounting to 80 to 85 percentum of the total carbonates present, separating the precipitated sodium bicarbonate from the brine, then agitating the brine under atmospheric pressure without the addition of additional carbon dioxide to form and to precipitate a second crop of sodium bicarbonate crystals in the brine, separating the second crop of sodium bicarbonate crystals from the brine, and then cooling the brine to precipitate substantially pure borax therefrom.

8. A process for recovering sodium bicarbonate from a brine containing sodium carbonate and sodium borate comprising carbonating the brine under a super-atmospheric pressure until (a) carbon dioxide is present in solution in excess of that required to convert substantially all the sodium carbonate present to sodium bicarbonate and (b) a first crop of sodium bicarbonate crystals precipitates in the brine amounting to 80 to 85 percentum of the total carbonates present, separating the precipitated sodium bicarbonate from the brine, then slowly agitating the brine under atmospheric pressure for a period of about eight hours to form and to precipitate a second crop of sodium bicarbonate crystals in the brine, separating the second crop of sodium bicarbonate crystals from the brine, and then recovering the sodium borate from the brine as substantially pure sodium borate decahydrate.

9. A process for recovering sodium bicarbonate from a brine containing sodium carbonate and sodium borate comprising carbonating the brine until (a) carbon dioxide is present in solution in excess of that required to convert substantially all the sodium carbonate present to sodium bicarbonate and (b) a first crop of sodium bicarbonate crystals precipitates in the brine, then agitating and aerating the brine to form and to precipitate a second crop of sodium bicarbonate crystals in the brine, separating the sodium bicarbonate crystals from the brine, and then recovering the sodium borate from the brine as substantially pure sodium borate decahydrate.

10. A process for recovering sodium bicarbonate from a brine containing sodium carbonate and sodium borate comprising carbonating the brine until (a) carbon dioxide is present in solution in excess of that required to convert substantially all the sodium carbonate present to sodium bicarbonate and (b) a first crop of sodium bicarbonate crystals precipitates in the brine, then agitating the brine in the presence of the first crop of crystals to form and to precipitate a second crop of sodium bicarbonate crystals in the brine, separating the first and the second crops of sodium bicarbonate crystals from the brine, and then recovering the sodium borate from the brine as substantially pure sodium borate decahydrate.

11. A process for recovering sodium bicarbonate from a brine containing sodium carbonate and sodium borate comprising carbonating the brine under a super-atmospheric pressure until (a) carbon dioxide is present in solution in excess of that required to convert substantially all the sodium carbonate present to sodium bicarbonate and (b) a first crop of sodium bicarbonate crystals precipitates in the brine amounting to 80 to 85 percentum of the total carbonates present, then slowly agitating the brine under atmospheric pressure for a period of about eight hours to form and to precipitate a second crop of sodium bicarbonate crystals in the brine, separating the sodium bicarbonate crystals from the brine, and then recovering the sodium borate from the brine as substantially pure sodium borate decahydrate.

LYNN A. BLACKMUN.

REFERENCES CITED

The following references are of record in the file of this patent:

UNITED STATES PATENTS

| Number | Name | Date |
|---|---|---|
| 1,000,138 | Wrinkle et al. | Aug. 8, 1911 |
| 1,232,156 | Wrinkle et al. | July 3, 1917 |
| 1,343,508 | Hirschkind | June 15, 1920 |
| 1,350,090 | Wrinkle et al. | Aug. 17, 1920 |
| 1,756,122 | Hellmers | Apr. 29, 1930 |
| 1,865,832 | Chesny | July 5, 1932 |
| 1,865,833 | Chesny | July 5, 1932 |
| 1,911,794 | Britton | May 30, 1933 |
| 2,105,109 | Dolley | Jan. 11, 1938 |